United States Patent [19]

Batscheider et al.

[11] Patent Number: 5,783,612
[45] Date of Patent: Jul. 21, 1998

[54] EXPANDABLE STYRENE POLYMERS

[75] Inventors: Karl-Heinz Batscheider, Mutterstadt; Klaus Hahn, Kirchheim; Frank Braun; Joachim Rösch, both of Ludwigshafen, all of Germany

[73] Assignee: BASF Aktiengesellschaft, Ludwigshafen, Germany

[21] Appl. No.: 899,646

[22] Filed: Jul. 24, 1997

[30] Foreign Application Priority Data

Jul. 24, 1996 [DE] Germany ............... 196 29 791.5

[51] Int. Cl.$^6$ ................... C08J 9/18; C08J 9/20
[52] U.S. Cl. ................. 521/56; 521/60; 521/98
[58] Field of Search ................. 521/56, 60, 98

[56] References Cited

U.S. PATENT DOCUMENTS

| | | | |
|---|---|---|---|
| 3,755,209 | 8/1973 | Nintz et al. | 521/56 |
| 4,003,858 | 1/1977 | Biglione et al. | 521/60 |
| 4,361,656 | 11/1982 | Mostafa | 521/56 |
| 4,525,484 | 6/1985 | Hahn et al. | 521/56 |
| 4,785,022 | 11/1988 | Sonnenberg et al. | 521/57 |

FOREIGN PATENT DOCUMENTS

| | | |
|---|---|---|
| 32 43 885 | 6/1983 | Germany. |
| 2 110 217 | 6/1983 | United Kingdom. |

*Primary Examiner*—Morton Foelak
*Attorney, Agent, or Firm*—Oblon, Spivak, McClelland, Maier & Neustadt, P.C.

[57] ABSTRACT

Expandable styrene bead polymers having improved expandability contain from 1 to 20% by weight of a liquid oligomeric aliphatic olefin having 2 to 20 carbon atoms and a degree of polymerization of from 2 to 200.

2 Claims, No Drawings

EXPANDABLE STYRENE POLYMERS

The present invention relates to expandable styrene bead polymers (EPS) having good expandability.

Foams based on sytrene polymers have become very important industrially as heat insulation and packaging material. They are produced industrially on a large scale by first preparing EPS beads by suspension polymerization of styrene in the presence of blowing agents, expanding said beads by heating to give foam particles and then welding the latter in molds to give shaped articles.

Expandability is an important property for the processing of EPS beads containing blowing agent. For the preparation of foam particles comprising EPS, high expandability means that expansion can be carried out to lower bulk densities or substantially faster using comparable amounts of blowing agent or comparable bulk densities are achieved using substantially smaller amounts of blowing agent.

In order to achieve very low bulk densities and a high expansion rate, the suspension polymerization for the preparation of EPS is usually carried out in the presence of chain regulators, for example dimeric α-methylstyrene. However, this is of limited efficiency and moreover leads to a reduction in the molecular weight and hence in the melt viscosity of the polystyrene. In the case of large amounts of chain regulator, this makes it impossible to produce dimensionally stable foam elements.

It is an object of the present invention to provide an expandable styrene bead polymer having improved expandability, without adversely affecting the other processing and product properties.

We have found that this object is achieved, according to the invention, by an expandable styrene polymer which contains from 1 to 20% by weight of an oligomeric olefin having 2 to 20 carbon atomes and a degree of polymerization of from 2 to 200.

Further subjects of the invention are processes for the preparation of expandable styrene bead polymers wherein 0.2 to 20% by weight of the oligomeric olefin are added.

It is known that polyisobutylenes act as elasticizers (EP-A 327 001) for polystyrene foam and that polyethylene waxes can be added as a nucleating agent in the preparation of EPS (DE-A 32 43 885). Both of these are substances which are solid at room temperature and are unsuitable for improving the expandability.

According to DE-A 24 40 026, from 0.02 to 0.15% by weight, based on styrene, of a low molecular weight, liquid polyisobutylene is added as a nucleating agent for reducing the cell size in the suspension polymerization for the preparation of EPS. According to this publication, a further increase in the amount of polyisobutylene added to above 0.5% by weight would have been expected to lead to a dramatic decrease in the cell size to extremely low values. Surprisingly, however, this is not the case. At any rate, the publication does not state that isobutene oligomers should be added in amounts of 0.5% by weight or more in order to improve the expandability.

U.S. Pat. No. 4,785,022 relates to drinking-cups made by expanding and molding prefoamed polystyrene beads. These beads have been obtained by impregnation of polystyrene granules, which had been coated with 0.05 to 0.75% by weight of a butene or isobutene oligomer, with a blowing agent in aqueous suspension. The oligomer prevents the formation of pores in the polystyrene foam and in that way leakage in the drinking-cup. An improvement of expandability of the expandable beads is not mentioned.

For the purposes of the present invention, styrene polymers are polystyrene and copolymers of styrene with other α,β-olefinically unsaturated compounds which contain at least 50 parts by weight of styrene as polymerized units. In the preparation of the novel EPS, for example, α-methylstyrene, styrenes halogenated in the nucleus, styrenes alkylated in the nucleus, acrylonitrile, esters of acrylic or methacrylic acid with alcohols of 1 to 8 carbon atoms, N-vinyl compounds, such as vinylcarbazole, or even small amounts of compounds which contain two polymerizable double bonds, such as butadiene, divinylbenzene or butanediol diacrylate, are therefore suitable as comonomers.

In general, from 1 to 10, preferably from 3 to 8, % by weight, based on the styrene polymer, of a $C_3$–$C_7$-hydrocarbon (such as propane, butane, isobutane, n-pentane, isopentane, neopentane and/or hexane) and/or carbon dioxide are used as blowing agent.

The styrene polymers may also contain other substances which are added in the usual amounts and impart certain properties to the expandable products. Examples are flameproofing agents based on an organic bromine or chlorine compound, such as trisdibromopropyl phosphate, hexabromocyclododecane and chloroparaffin, and synergistic agents for flameproofing agents, such as dicumyl and highly unstable organic peroxides; and antistatic agents, stabilizers, colorants, carbon black, graphite, lubricants, fillers and substances which have an antiadhesive action during the expansion, such as zinc stearate, melamine/formaldehyde condensates or silica.

Depending on the intended action, the additives may be homogeneously distributed in the particles or be present as a surface coating. Accordingly, the additives are added in the novel process or subsequently applied to the expandable styrene polymers prepared according to the invention.

In a preferred process, expandable styrene bead polymers are prepared by polymerization of styrene, if required together with up to 50% by weight of the abovementioned comonomers, in aqueous suspension, the blowing agents described above and, if required, conventional additives being added in effective amounts before, during or after the polymerization. The process is carried out in the presence of a suspension stabilizer, for example polyvinylpyrrolidone, polyvinyl alcohol or hydroxyethylcellulose, and Pickering stabilizers, e.g. magnesium phosphate or tricalcium phosphate. Furthermore, the novel styrene polymers can also be prepared by adding the oligomers to a melt of the styrene polymer, preferably in an extruder. Here, the blowing agent can be incorporated directly into the melt.

According to the invention, 0.2 to 20, preferably from 1 to 10, % by weight, based on the monomers, of an oligomeric aliphatic olefin having 2 to 20, preferably 3 to 5, carbon atoms and a degree of polymerization of from 2 to 200, preferably from 2 to 100, in particular from 5 to 50, are added during the EPS preparation. Co-oligomers are also suitable. The oligomeric olefins can be prepared using traditional Ziegler-Natta catalysts. Oligomeric aliphatic olefins which have terminal double bonds are particularly preferred. It is not absolutely essential for all chain ends of the oligomers to carry double bonds, but the predominant number should do so. The molecular weight distribution Mw:Mn of such olefin oligomers is preferably from 1.0 to 2.4. The olefin oligomers can be prepared, for example, by polymerization of the corresponding olefins using metallocene catalysts, as described in German Patent Application P 195 03 089.3.

After the end of polymerization, the expandable styrene bead polymers obtained in the novel process are isolated from the aqueous phase in a known manner, washed and dried.

The styrene polymer particles prepared according to the invention and containing blowing agent generally have a diameter of from 0.2 to 4 mm. They can be expanded by conventional methods, for example with steam, to give foam particles having a diameter of from 0.1 to 2 cm and a bulk density of from 0.005 to 0.1 g/cm$^3$.

The pre-expanded particles can then be subjected to final expansion by conventional methods to give shaped foam articles having a density of from 0.005 to 0.1 g/cm$^3$.

In the Examples which follow, parts and percentages are by weight.

EXAMPLES

Preparation of the Olefin Oligomers
A. Propene oligomer

In a 1 l stirred autoclave, 16 ml of a 1.7 molar methylaluminoxane solution in toluene were initially taken, 500 g (11.9 mol) of liquid propene were condensed onto this and the mixture was heated to 50° C. The resulting pressure was 2200 kPa. 79.6 mg (0.1 mmol) of bis(n-octadecylcyclopentadienyl)zirconium dichloride, dissolved in 9.4 ml of a 1.7 molar solution of methylaluminoxane in toluene (Al:Zr=432:1) were then added. Thereafter, oligomerization was carried out for 120 minutes and the reactor was let down and the turbidity was determined. It was 1.8. 450 g of liquid propene oligomer mixture were isolated: Mw=990, Mn=520, Mw/Mn=1.9.

Terminal Double Bonds (According to 1H-NMR) 100%
B. Isobutane oligomer

In a continuously operating polymerization apparatus, 12 kg/h of isobutene were polymerized with 8 g/h (=1.4 mmol/h/mol isobutene) of BF$_3$ with vigorous stirring and thorough cooling at −20° C. and 2.3 bar. The average residence time was 3 minutes. The polymerization was then stopped with 3 g of methanol/kg of discharged reaction mixture, after which the residual gases, the methanol and the lower oligomers were removed by distillation.

Mn=1050 g/mol, Mw=1900 g/mol Terminal double bonds (according to 1H-NMR) 85%

Polymerization

Example 1

A mixture of 195 parts of water, 0.39 part of sodium pyrophosphate, 0.58 part of magnesium sulfate, 170 parts of styrene, 8.5 parts of propene oligomer A, 0.34 part of dibenzoyl peroxide and 0.51 part of dicumyl peroxide were introduced into a pressure-resistant stirred kettle.

The mixture was heated to 90° C. in the course of two hours while stirring. 50 minutes after 90° C. had been reached, 4.9 parts of a 10% strength aqueous solution of polyvinylpyrrolidone were added. The mixture was then heated from 90° C. to 134° C. in the course of four hours. 195 minutes after 134° C. had been reached, 13.3 parts of pentane were added. Finally, stirring was carried out for a further four hours at 134° C. The crude product obtained was isolated and dried.

Example 2

The procedure was as in Example 1, except that 7.15 parts of pentane were used.

Example 3

The procedure was as in Example 1, except that 8.5 parts of the isobutene oligomer B were used instead of propene oligomer.

Example 4

The procedure was as in Example 3, except that 7.15 parts of pentane were used.

Example 5 (Comparison)

The procedure was as in Example 1, except that 0.11 part of dimeric α-methylstyrene (DMS) was used instead of the oligomer.

Example 6 (Comparison)

The procedure was as in Example 1, except that 8.6 parts of pentane and, instead of the oligomer, 0.34 part of DMS were used.

Example 7 (Comparison)

The procedure was as in Example 1, except that 8.0 parts of pentane were used. The addition of oligomers and DMS was dispensed with.

Example 8 (Comparison)

The procedure was as in Example 1, except that 6.3 parts of pentane and, instead of the oligomer, 0.6 part of DMS were used.
Working up The expandable polystyrene beads obtained were washed with demineralized water and freed from surface water in an air stream. The product dried in this manner was precoated with 0.2% by weight, based on the polymer, of zinc stearate and then separated into sieve fractions.

100 parts of the expandable polystyrene granules having the bead size fraction from 1.0 to 2.0 mm diameter were coated with 0.2 part of glyceryl monostearate by tumbling in a paddle mixer.
Pre-expansion of the EPS beads One part of the coated beads was treated with flowing steam in a batchwise pre-expander. Under standardized conditions (EPS weight: 100 g), it was possible to quantify the expandability. The data obtained are shown in Table 1. The results for the products from Examples 1, 3 and 5 show that, with the same blowing agent content, a lower bulk density is achieved after an expansion time of 1 minute with oligomer-containing products, ie. expansion can be carried out more rapidly.

In the other Examples, expansion was continued until the lowest possible bulk density was reached. Here, with virtually the same blowing agent, a lower minimum bulk density is reached in a shorter pre-expansion time with oligomer-containing products (Examples 4 and 7). Comparable bulk densities are achieved with oligomer-containing polymers with smaller amounts of blowing agents and in a shorter pre-expansion time (Examples 2 and 6).

TABLE 1

Behavior during pre-expansion (Products from Examples 1–8)

| Example | Oligomer[a] | DMS[a] | Pentane content[b] | Bulk density [g/l] | Pre-expansion time [min] |
|---|---|---|---|---|---|
| 1 | 5.0 | — | 6.3 | 19.2 | 1 |
| 3 | 5.0 | — | 6.3 | 19.2 | 1 |
| 5 | — | 0.065 | 6.2 | 23.0 | 1 |
| 2 | 5.0 | — | 3.3 | 16.7[c] | 2.5 |
| 6 | — | 0.2 | 4.0 | 16.1[c] | 6 |

TABLE 1-continued

Behavior during pre-expansion (Products from Examples 1–8)

| Example | Oligomer[a] | DMS[a] | Pentane content[b] | Bulk density [g/l] | Pre-expansion time [min] |
|---|---|---|---|---|---|
| 7 | — | — | 3.8 | 35.0[c] | 20 |
| 4 | 5.0 | — | 3.6 | 18.5[c] | 7 |
| 8 | — | 0.35 | 2.8 | 21.7[c] | 20 |

[a]% by weight based on monomeric styrene.
[b]% by weight, based on the end product.
[c]Minimum bulk density.

We claim:

1. A process for the preparation of expandable styrene bead polymers by polymerization of styrene, optionally in the presence of further comonomers, in aqueous suspension in the presence of suspension stabilizers and conventional styrene-soluble polymerization catalysts and with the addition of a blowing agent and from 0.2 to 20% by weight, based on the monomers, of an expansion assistant, wherein the expansion assistant is an oligomeric aliphatic olefin which is liquid at room temperature and has 2 to 20 carbon atoms and a number average degree of polymerization of from 2 to 200.

2. A process for the preparation of expandable styrene bead polymers by the addition of a blowing agent and 0.2 to 20% by weight, based on the monomers, of an expansion assistant to a melt of the styrene polymer, wherein the expansion assistant is an oligomeric aliphatic olefin which is liquid at room temperature and has 2 to 20 carbon atoms and a number average degree of polymerization of from 2 to 200.

* * * * *